(12) United States Patent
Zhang et al.

(10) Patent No.: US 12,492,624 B2
(45) Date of Patent: Dec. 9, 2025

(54) CLOSED-LOOP CONTROL OF A PLURALITY OF PUMP SYSTEMS OF A HYDRAULIC FRACTURING SYSTEM

(71) Applicant: Caterpillar Inc., Peoria, IL (US)

(72) Inventors: Yanchai Zhang, Dunlap, IL (US);
Isaac E. Fox, Houston, TX (US);
Matthew Parker, Washington, IL (US);
Shawn Damm, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 489 days.

(21) Appl. No.: 18/052,720

(22) Filed: Nov. 4, 2022

(65) Prior Publication Data
US 2024/0151126 A1   May 9, 2024

(51) Int. Cl.
*E21B 43/26* (2006.01)
*F04B 17/05* (2006.01)
*F04B 49/06* (2006.01)

(52) U.S. Cl.
CPC .......... *E21B 43/2607* (2020.05); *F04B 17/05* (2013.01); *F04B 49/065* (2013.01); *F04B 2203/0607* (2013.01)

(58) Field of Classification Search
CPC .................... F04B 17/05; F04B 49/065; F04B 2203/0607; E21B 43/2607
See application file for complete search history.

(56) References Cited

U.S. PATENT DOCUMENTS

| | | | |
|---|---|---|---|
| 6,061,637 A * | 5/2000 | Sorge .................. | G01N 33/225 73/23.31 |
| 9,228,506 B2 | 1/2016 | Gokhale et al. | |
| 9,371,789 B2 | 6/2016 | Rosswurm et al. | |
| 9,719,447 B2 | 8/2017 | Sixel et al. | |
| 10,006,398 B2 | 6/2018 | Atterberry et al. | |
| 10,260,982 B2 | 4/2019 | Peters et al. | |
| 10,662,765 B2 * | 5/2020 | Ferguson ............... | H04N 23/60 |
| 10,815,913 B2 | 10/2020 | Bruner et al. | |
| 11,913,392 B2 * | 2/2024 | Lana .................. | F02D 41/1451 |
| 2012/0166096 A1 * | 6/2012 | Stephenson ............ | G07C 5/008 700/275 |
| 2014/0373822 A1 * | 12/2014 | Rosswurm .......... | F02D 41/0025 123/676 |
| 2015/0377161 A1 | 12/2015 | Smith et al. | |
| 2017/0157563 A1 * | 6/2017 | Ginter ................ | B01D 53/9418 |

(Continued)

*Primary Examiner* — Vincent H Tran (57) ABSTRACT

A control system identifies preferred performance information associated with a hydraulic fracturing system; and obtains engine operation information associated with a plurality of engines included in a plurality of respective pump systems of the hydraulic fracturing system. The control system identifies, based on the engine operation information, a set of one or more engines, of the plurality of engines, that are utilizing gaseous fuel and/or that are capable of utilizing gaseous fuel, and obtains methane number information associated with the set of one or more engines. The control system selects, based on the preferred performance information and the methane number information, a set of one or more operation optimization maps, determines, based on the set of one or more operation optimization maps and the engine operation information, control information associated with the plurality of pump systems. The control system controls, based on the control information, the plurality of pump systems.

20 Claims, 4 Drawing Sheets

(56) References Cited

U.S. PATENT DOCUMENTS

| | | | |
|---|---|---|---|
| 2017/0218837 A1* | 8/2017 | Zhong | F02B 43/12 |
| 2018/0112622 A1* | 4/2018 | Atterberry | F02D 41/3005 |
| 2018/0372013 A1* | 12/2018 | Turlapati | F02D 35/027 |
| 2020/0103388 A1* | 4/2020 | Lucas | E21B 43/11 |
| 2023/0228177 A1* | 7/2023 | Zhang | G05B 13/021 |
| | | | 417/1 |
| 2023/0228178 A1* | 7/2023 | Converse | F04B 49/20 |
| | | | 166/308.1 |
| 2024/0410329 A1* | 12/2024 | Kaneko | F02D 41/22 |

\* cited by examiner

CLOSED-LOOP CONTROL OF A PLURALITY OF PUMP SYSTEMS OF A HYDRAULIC FRACTURING SYSTEM

TECHNICAL FIELD

The present disclosure relates generally to a hydraulic fracturing system and, for example, to closed-loop control of a plurality of pump systems of the hydraulic fracturing system.

BACKGROUND

Hydraulic fracturing is a means for extracting oil and gas from rock, typically to supplement a horizontal drilling operation. In particular, high pressure fluid (referred to as a fracturing fluid) is used to fracture the rock, stimulating a flow of oil and gas through the rock to increase the volumes of oil or gas that can be recovered. A pump system (e.g., that is housed on a hydraulic fracturing rig) that includes, among other components, an engine, a transmission, and a fluid pump, is typically used to inject the high pressure fluid into a wellhead associated with a hydraulic fracturing site.

Hydraulic fracturing may involve the use of a hydraulic fracturing system that includes multiple pump systems operating at a same or different pressures to achieve a flow rate for the fluid (e. g., measured in barrels per minute). However, operation of the pump systems often does not take into account other considerations, such as the total emissions produced by the pump systems or fuel consumption cost of the pump systems. For example, these pump systems can exhaust a complex mixture of emissions that are generally composed of particulates and gaseous compounds including nitrogen oxides (commonly referred to as "NOx") and carbon dioxides (commonly referred to as "$CO_2$") or carbon dioxide equivalents ($CO_2$-e), among others. Due to increased awareness of an environmental impact of such emissions, it is typically preferred to reduce the amount of emissions of the pump systems, while still maintaining a preferred performance of the hydraulic fracturing system (e.g., in terms of fluid flow rate and/or pressure).

U.S. Pat. No. 10,815,913 (the '913 patent) discloses systems and methods for fueling control of a dual fuel internal combustion engine, such as to improve operational outcomes of the engine. While the '913 patent discloses a controller for controlling operations of a dual fuel engine in response to knock conditions, it does not disclose closed-loop control of a plurality of pump systems (that include a plurality of respective engines) of a hydraulic fracturing system.

Accordingly, the control system of the present disclosure solves one or more of the problems set forth above and/or other problems in the art.

SUMMARY

In some implementations, a control system includes one or more memories; and one or more processors, coupled to the one or more memories, configured to: identify preferred performance information associated with a hydraulic fracturing system; obtain engine operation information associated with a plurality of engines included in a plurality of respective pump systems that are associated with the hydraulic fracturing system; identify, based on the engine operation information, a set of one or more engines, of the plurality of engines, that are utilizing gaseous fuel or that are capable of utilizing gaseous fuel; obtain methane number information associated with the set of one or more engines; select, based on the preferred performance information and the methane number information, a set of one or more operation optimization maps from a plurality of operation optimization maps; determine, based on the set of one or more operation optimization maps and the engine operation information, control information associated with the plurality of pump systems; and control, based on the control information, the plurality of pump systems.

In some implementations, a method includes obtaining, by a control system, engine operation information associated with a plurality of engines included in a plurality of respective pump systems that are associated with a hydraulic fracturing system; identifying, by the control system and based on the engine operation information, a set of one or more engines, of the plurality of engines, that are utilizing gaseous fuel or that are capable of utilizing gaseous fuel; obtaining, by the control system, methane number information associated with the set of one or more engines; determining, based on the methane number information and the engine operation information, control information associated with the plurality of pump systems; and controlling, based on the control information, the plurality of pump systems.

In some implementations, a non-transitory computer-readable medium storing a set of instructions includes one or more instructions that, when executed by one or more processors of a control system, cause the control system to: obtain engine operation information associated with a plurality of engines included in a plurality of respective pump systems that are associated with a hydraulic fracturing system; identify a set of one or more engines, of the plurality of engines, that are utilizing gaseous fuel or that are capable of utilizing gaseous fuel; select, based on methane number information associated with the set of one or more engines, a set of one or more operation optimization maps from a plurality of operation optimization maps; determine, based on the set of one or more operation optimization maps and the engine operation information, control information associated with the plurality of pump systems; and control, based on the control information, the plurality of pump systems.

DETAILED DESCRIPTION

Figure 1:
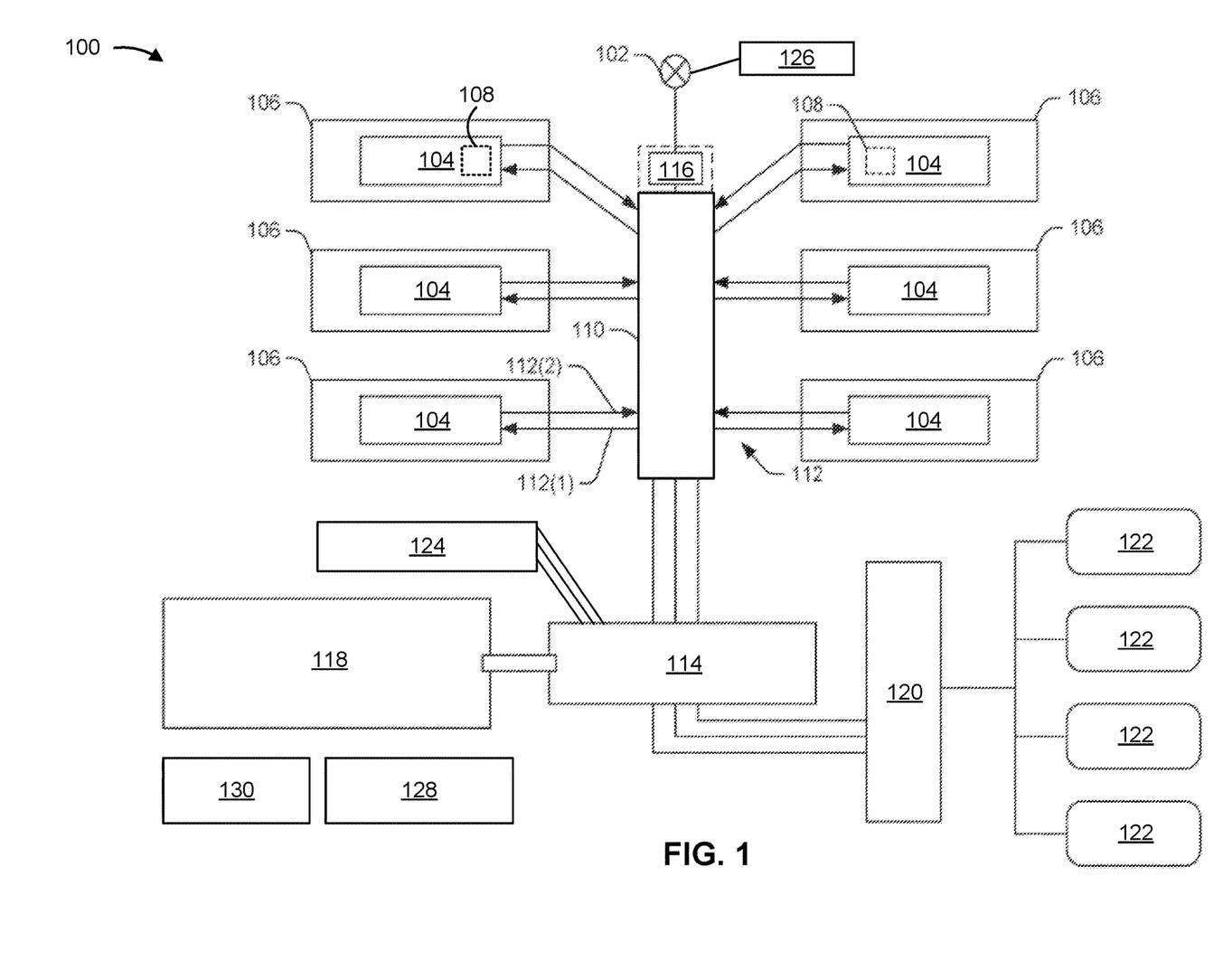
FIG. 1 is a diagram illustrating an example hydraulic fracturing system.

FIG. 1 is a diagram illustrating an example hydraulic fracturing system 100. For example, FIG. 1 depicts a plan view of an example hydraulic fracturing site along with equipment that is used during a hydraulic fracturing process. In some examples, less equipment, additional equipment, or alternative equipment to the example equipment depicted in FIG. 1 may be used to conduct the hydraulic fracturing process.

The hydraulic fracturing system 100 includes a well 102. As described above, hydraulic fracturing is a well-stimulation technique that uses high-pressure injection of fracturing fluid into the well 102 and corresponding wellbore in order to hydraulically fracture a rock formation surrounding the wellbore. While the description provided herein describes hydraulic fracturing in the context of wellbore stimulation for oil and gas production, the description herein is also applicable to other uses of hydraulic fracturing.

High-pressure injection of the fracturing fluid may be achieved by one or more pump systems 104 that may be respectively mounted (or housed) on one or more hydraulic fracturing rigs 106 (which also may be referred to as "hydraulic fracturing trailers") of the hydraulic fracturing system 100. Each of the pump systems 104 includes at least one fluid pump 108 (referred to herein collectively, as "fluid pumps 108" and individually as "a fluid pump 108"). The fluid pumps 108 may be hydraulic fracturing pumps. The fluid pumps 108 may include various types of high-volume hydraulic fracturing pumps such as triplex or quintuplex pumps. Additionally, or alternatively, the fluid pumps 108 may include other types of reciprocating positive-displacement pumps or gear pumps. A type and/or a configuration of the fluid pumps 108 may vary depending on the fracture gradient of the rock formation that will be hydraulically fractured, the quantity of fluid pumps 108 used in the hydraulic fracturing system 100, the flow rate necessary to complete the hydraulic fracture, the pressure necessary to complete the hydraulic fracture, or the like. The hydraulic fracturing system 100 may include any number of hydraulic fracturing rigs 106 having fluid pumps 108 thereon in order to pump hydraulic fracturing fluid at a predetermined rate and pressure.

In some examples, the fluid pumps 108 may be in fluid communication with a manifold 110 via various fluid conduits 112, such as flow lines, pipes, or other types of fluid conduits. The manifold 110 combines fracturing fluid received from the fluid pumps 108 prior to injecting the fracturing fluid into the well 102. The manifold 110 also distributes fracturing fluid to the fluid pumps 108 that the manifold 110 receives from a blender 114 of the hydraulic fracturing system 100. In some examples, the various fluids are transferred between the various components of the hydraulic fracturing system 100 via the fluid conduits 112. The fluid conduits 112 include low-pressure fluid conduits 112(1) and high-pressure fluid conduits 112(2). In some examples, the low-pressure fluid conduits 112(1) deliver fracturing fluid from the manifold 110 to the fluid pumps 108, and the high-pressure fluid conduits 112(2) transfer high-pressure fracturing fluid from the fluid pumps 108 to the manifold 110.

The manifold 110 also includes a fracturing head 116. The fracturing head 116 may be included on a same support structure as the manifold 110. The fracturing head 116 receives fracturing fluid from the manifold 110 and delivers the fracturing fluid to the well 102 (via a well head mounted on the well 102) during a hydraulic fracturing process. In some examples, the fracturing head 116 may be fluidly connected to multiple wells. The fluid pumps 108, the fluid conduits 112, the manifold 110, and/or the fracturing head 116 may define a fluid system of the hydraulic fracturing system 100.

The blender 114 combines proppant (e.g., and or a similar particulate material suspended in water or other fluid) received from a proppant storage unit 118 with fluid received from a hydration unit 120 of the hydraulic fracturing system 100. In some examples, the proppant storage unit 118 may include a dump truck, a truck with a trailer, one or more silos, or other type of containers. The hydration unit 120 receives water from one or more water tanks 122. In some examples, the hydraulic fracturing system 100 may receive water from water pits, water trucks, water lines, and/or any other suitable source of water. The hydration unit 120 may include one or more tanks, pumps, gates, or the like.

The hydration unit 120 may add fluid additives, such as polymers or other chemical additives, to the water. Such additives may increase the viscosity of the fracturing fluid prior to mixing the fluid with proppant in the blender 114. The additives may also modify a pH of the fracturing fluid to an appropriate level for injection into a targeted formation surrounding the wellbore. Additionally, or alternatively, the hydraulic fracturing system 100 may include one or more fluid additive storage units 124 that store fluid additives. The fluid additive storage unit 124 may be in fluid communication with the hydration unit 120 and/or the blender 114 to add fluid additives to the fracturing fluid.

In some examples, the hydraulic fracturing system 100 may include a balancing pump 126. The balancing pump 126 provides balancing of a differential pressure in an annulus of the well 102.

The hydraulic fracturing system 100 may include a control system 128. The control system 128 may be include a processor, such as a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. The processor may be implemented in hardware, firmware, and/or a combination of hardware and software. The control system 128 may include one or more processors capable of being programmed to perform a function. One or more memories, including a random-access memory (RAM), a read only memory (ROM), and/or another type of dynamic or static storage device (e.g., a flash memory, a magnetic memory, and/or an optical memory) may store information and/or instructions for use by the control system 128. The control system 128 may include a memory (e.g., a non-transitory computer-readable medium) capable of storing instructions, that when executed, cause the processor to perform one or more processes and/or methods described herein.

The control system 128 may manage, monitor, and/or control the hydraulic fracturing process performed by the hydraulic fracturing system 100 and the equipment used in the process. In some examples, the management, monitoring, and/or controlling operations may be performed from multiple locations. The control system 128 may be supported on a van or a truck, or may be otherwise mobile. The control system 128 may include a display for displaying data for monitoring performance and/or optimizing operation of the hydraulic fracturing system 100. In some examples, data gathered by the control system 128 may be sent off-board or off-site for monitoring performance and/or performing calculations relative to the hydraulic fracturing system 100. The control system 128 may be configured to control the pump systems 104, as further described herein.

The hydraulic fracturing system 100 includes a controller 130. The controller 130 is in communication (e.g., by a wired connection or a wireless connection) with the control system 128 and the pump systems 104 of the hydraulic fracturing rigs 106. The controller 130 may also be in communication with other equipment and/or systems of the hydraulic fracturing system 100, such as sensors (e.g., sensors 210 described herein), engines (e.g., engines 202 described herein), transmissions (e.g., transmissions 204 described herein), and/or other components of the pump systems 104. The controller 130 may include one or more memories, one or more processors, and/or one or more communication components.

As indicated above, FIG. 1 is provided as an example. Other examples may differ from what is described with regard to FIG. 1.

Figure 2:
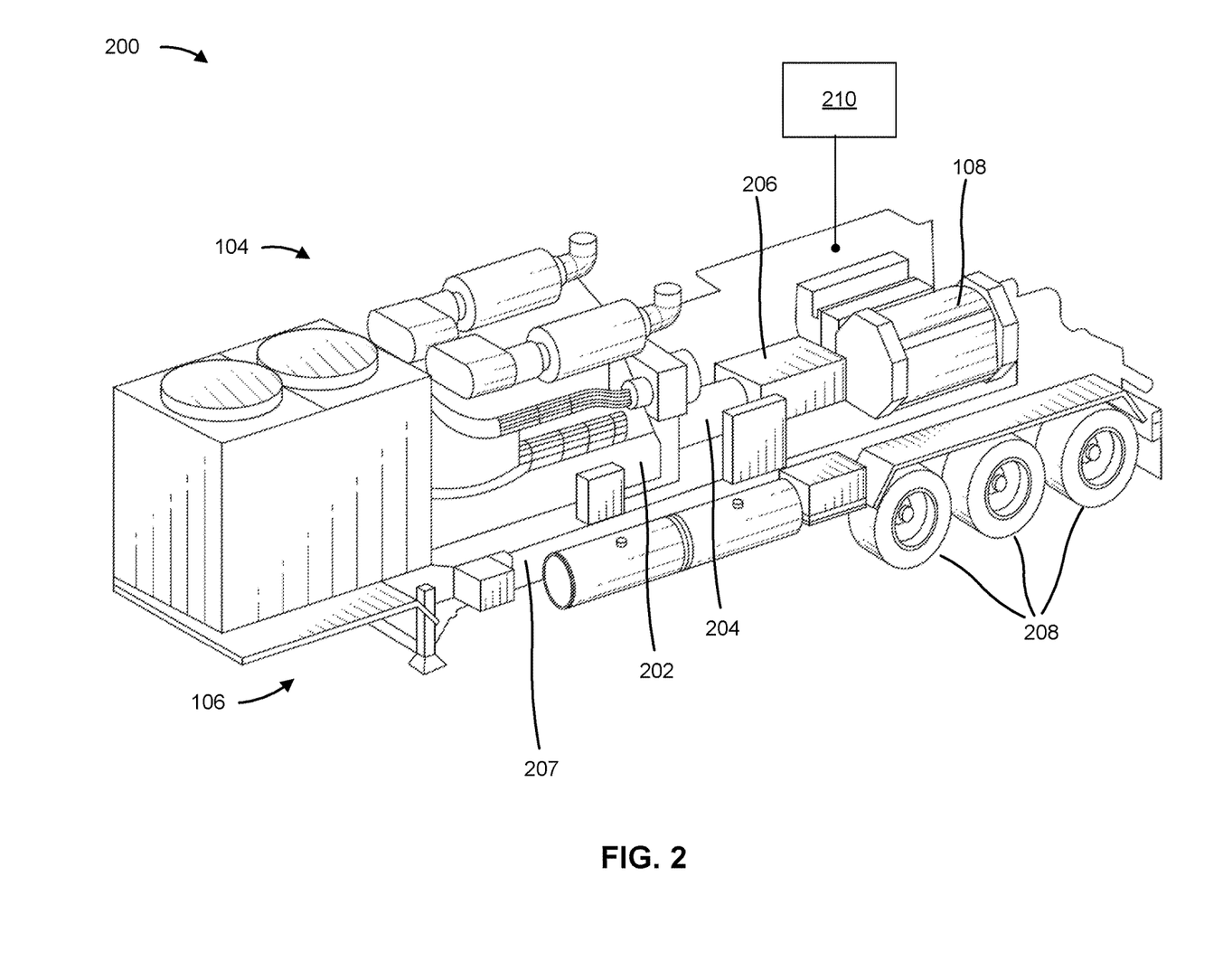
FIG. 2 is a diagram illustrating an example pump system on an example hydraulic fracturing rig.

FIG. 2 is a diagram 200 illustrating an example pump system 104 on an example hydraulic fracturing rig 106. As shown in FIG. 2, the pump system 104 may include an engine 202, a transmission 204 that is operatively connected to and driven by the engine 202, and a fluid pump 108 that is operatively connected to and driven by the transmission 204. The engine 202 may include a gasoline or diesel combustion engine, a dynamic gas blending (DGB) engine, a fuel cell, a natural gas engine, and/or a similar engine. That is, the engine 202 may be capable of utilizing liquid fuel (e.g., diesel, gasoline, or another liquid fuel), gaseous fuel (e.g., natural gas, landfill gas, or another gaseous fuel), and/or another type of fuel. The transmission 204 may be configured with a plurality of gears operative between the engine 202 and an output shaft (not shown) of the transmission 204 to alter a rotational speed of an output of the engine 202. In some implementations, a gear mechanism 206 (e.g., a fixed gear mechanism) may be provided between the output shaft of the transmission 204 and a drive shaft (not shown) of the fluid pump 108 to transfer torque from the engine 202 to the fluid pump 108. Because the fracturing process may require introduction of fluids at different locations about a hydraulic fracturing site, the hydraulic fracturing rig 106 may be supported by a mobile trailer 207 disposed on wheels 208 to enable transportation of the hydraulic fracturing rig 106 about the hydraulic fracturing site.

A set of one or more sensors 210 may be positioned and configured to detect or measure one or more physical properties related to operation and/or performance of the various components of the pump system 104 and/or the hydraulic fracturing system 100. For example, a sensor 210 may provide a sensor signal indicative of a speed of the engine 202 (e.g., a rotational speed of the engine 202), a sensor signal indicative of a load of the engine 202, a sensor signal indicative of an intake manifold air temperature (IMAT) of the engine 202, a sensor signal indicative of a fuel mode of the engine 202 (e.g., whether the engine 202 is utilizing liquid fuel, gaseous fuel, and/or another type of fuel, and/or whether the engine 202 is capable of utilizing liquid fuel, gaseous fuel, and/or the other type of fuel), a sensor signal indicative of an amount of fuel (liquid and/or gaseous) consumed by the engine 202, a sensor signal indicative of an amount of certain gasses or particulates in emissions from the engine 202, a sensor signal indicative of a gear position of the transmission 204, and/or a sensor signal indicative of a pressure of a fracturing fluid at the fluid pump 108 (e.g., at an inlet or outlet of the fluid pump 108), among other examples.

Each of the pump systems 104 and associated hydraulic fracturing rigs 106 may have a same, or similar, configuration. Accordingly, the plurality of pump systems 104 may respectively include a plurality of engines 202, a plurality of transmission 204, a plurality of fluid pumps 108, and a plurality of sets of one or more sensors 210.

As indicated above, FIG. 2 is provided as an example. Other examples may differ from what is described with regard to FIG. 2.

Figure 3:
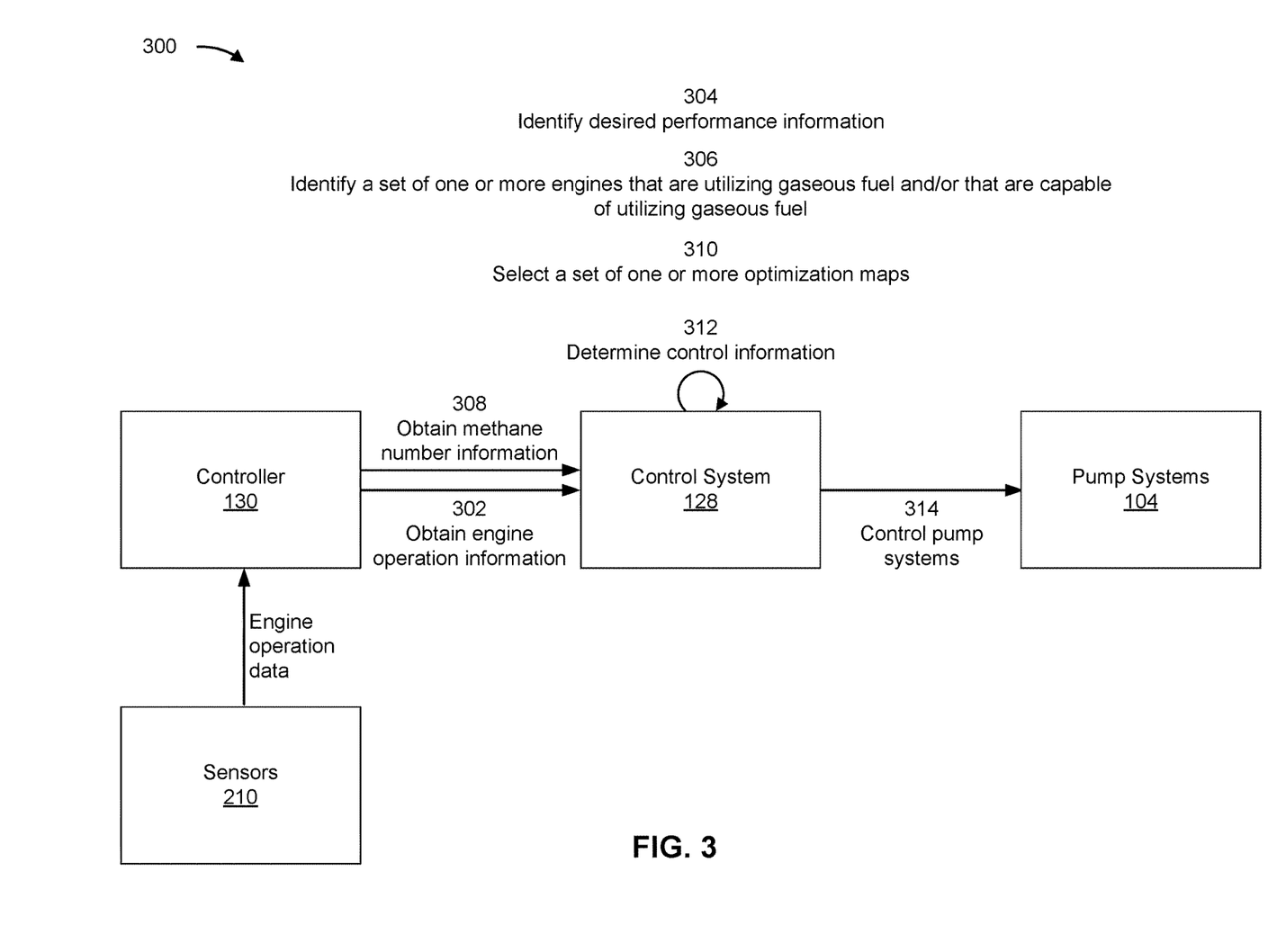
FIG. 3 is a diagram of an example of a control system controlling a plurality of pump systems of a hydraulic fracturing system.

FIG. 3 is a diagram 300 of an example of the control system 128 controlling a plurality of pump systems 104 of a hydraulic fracturing system 100.

As shown in FIG. 3, and by reference number 302, the control system 128 may obtain engine operation information. The engine operation information may be associated with the plurality of engines 202 that are respectively included in the plurality of pump systems 104. For example, the controller 130 may communicate with the plurality of sets of the one or more sensors 210 to obtain respective engine operation data associated with the plurality of engines 202, and may process the respective engine operation data to generate the engine operation information. Accordingly, the engine operation information may indicate, for each engine 202, of the plurality of engines 202, one or more operating parameters of the engine 202. For example, the engine operation information may indicate, for each engine 202, of the plurality of engines 202, a speed of the engine 202, a load of the engine 202, an IMAT of the engine 202, a fuel mode of the engine 202, and/or another operating parameter of the engine 202. The controller 130 then may send the engine operation information to the control system 128. For example, the controller 130 may send the engine operation information to the control system 128 as the control system 128 generates the engine operation information (e.g., in real-time or near real-time). As another example, the controller 130 may send the engine operation information to the control system 128 on a scheduled basis, on an on-demand basis, on a triggered basis, or on an ad-hoc basis.

As shown by reference number 304, the control system 128 may identify preferred performance information associated with the hydraulic fracturing system 100. The preferred performance information may indicate one or more preferred performance parameters of the hydraulic fracturing system 100, such as a preferred flow rate of fracturing fluid of the hydraulic fracturing system 100 (e.g., from the hydraulic fracturing system 100 to the well 102), a preferred discharge pressure of the fracturing fluid of the hydraulic fracturing system 100 (e.g., at the fracturing head 116), a preferred inlet pressure of the fracturing fluid of the hydraulic fracturing system 100 (e.g., in the manifold 110), and/or another preferred performance parameter.

The control system 128 may access a data structure (e.g., a database, a table, an electronic file, or another data structure) to identify the preferred performance information. For example, an operator of the control system 128 may interact with a user interface of the control system 128 to generate the preferred performance information, and the control system 128 may cause the preferred performance information to be stored in the data structure, such as by directly causing the preferred performance information to be stored in the data structure or by communicating with the controller 130 to cause the controller 130 to store the preferred performance information in the data structure. The control system 128 may identify the preferred performance information by directly accessing the data structure, or, alternatively, by communicating with the controller 130 to cause the controller 130 to access the data structure and provide the preferred performance information to the control system 128.

As shown by reference number 306, the control system 128 may identify a set of one or more engines 202, of the plurality of engines 202, that are utilizing gaseous fuel (e.g., that are actively using gaseous fuel to operate) and/or that are capable of utilizing gaseous fuel. For example, the control system 128 may process the engine operation information to determine respective fuel modes of the plurality of engines 202. Accordingly, the control system 128 may identify, based on the respective fuel modes, particular engines 202, of the plurality of engines 202, that are utilizing at least some percentage of gaseous fuel (e.g., to operate) and/or that are capable of utilizing gaseous fuel, as the set of one or more engines 202.

As shown by reference number 308, the control system 128 may obtain methane number information (e.g., based on identifying the set of one or more engines 202 that are utilizing gaseous fuel and/or that are capable of utilizing gaseous fuel). The methane number information may be associated with the set of one or more engines 202. For example, the methane number information may indicate, for each engine 202, of the set of one or more engines 202, an estimated methane number of a gaseous fuel of the engine 202.

To obtain the methane number information, the control system 128, for example, may provide information identifying the set of one or more engines 202 to the controller 130. The controller 130 may thereby determine an estimated methane number for each engine 202 of the set of one or more engines 202. For example, the controller 130 may process the operation data from each engine 202 (e.g., that the controller 130 obtained as described herein in relation to reference number 302) to identify a particular set of operation data. The particular set of operation data may include one or more operating parameters of the engine 202, such as a speed of the engine 202, a load of the engine 202, an IMAT of the engine 202, a gaseous fuel utilization percentage of the engine 202, a fuel burn duration of the engine 202, and/or another operating parameter of the engine 202. The controller 130 may process the particular set of operation data to determine the estimated methane number of a gaseous fuel of the engine 202. Moreover, the controller may generate the methane number information to indicate, for each engine 202, of the set of one or more engines 202, the estimated methane number. The controller 130 then may send the methane number information to the control system 128. Alternatively, the control system 128 may determine the methane number information in a similar manner as that of the controller 130 (e.g., based on the engine operation information).

As shown by reference number 310, the control system 128 may select a set of one or more operation optimization maps from a plurality of operation optimization maps (e.g., that are based on methane number and/or IMAT, among other examples). The plurality of operation optimization maps may include one or more emissions optimization maps, one or more performance optimization maps, one or more fuel optimization maps, and/or one or more other operation optimization maps. A map, of the plurality of maps, may provide an indication of one or more output parameters of the hydraulic fracturing system 100 (e.g., of the plurality of engines 202) as a function of one or more input parameters of the hydraulic fracturing system 100 (e.g., of the plurality of engines 202), such as of one or more operating parameters of the plurality of engines 202. For example, an emissions optimization map may indicate a net amount of emissions of the plurality of engines 202 as a function of respective speeds, loads, and/or IMATs of the plurality of engines 202. As another example, a performance optimization map may indicate a net efficiency of the plurality of engines 202 as a function of respective speeds and/or loads of the plurality of engines 202. In another example, a fuel optimization map (e.g., a brake specific fuel consumption (BSFC) map) may indicate a fuel efficiency of the plurality of engines 202 as a function of respective fuel consumptions of and/or respective powers produced by the plurality of engines 202.

The control system 128 may select the set of one or more operation optimization maps, from the plurality of operation optimization maps, based on the preferred performance information (e.g., that indicates one or more preferred performance parameters of the hydraulic fracturing system 100) and/or the methane number information (e.g., that indicates an estimated methane number for each engine 202 of the set of one or more engines 202 that are utilizing gaseous fuel and/or that are capable of utilizing gaseous fuel). For example, each operation optimization map, of the plurality of operation optimization maps, may be associated with respective ranges of performance parameter values and/or methane numbers. The control system 128 may identify one or more particular operation optimization maps, of the plurality of operation optimization maps, that have respective ranges of performance parameter values in which the one or more preferred performance parameters of the hydraulic fracturing system 100, as indicated by the preferred performance information, are included, and/or that has a range of methane numbers in which the estimated methane numbers of the set of one or more engines 202, as indicated by the methane number information, are included. The control system 128 may therefore select the one or more particular operation optimization maps as the set of one or more operation optimization maps.

As shown by reference number 312, the control system 128 may determine control information. The control information may be associated with the plurality of pump systems 104. For example, the control information may indicate, for each pump system 104, of the plurality of pump systems 104, one or more control parameters, such as a preferred flow rate of fracturing fluid of the pump system 104, a preferred speed of an engine 202 included in the pump system 104, and/or a preferred gear of a transmission 204 included in the pump system 104, and/or another control parameter.

The control system 128 may determine the control information based on the set of one or more operation optimization maps and the engine operation information (e.g., that indicates one or more operating parameters of each engine 202 of the plurality of engines 202). For example, the control system 128 may respectively process the engine operation information using the set of one or more operation optimization maps to determine one or more sets of one or more control parameters (e.g., where each set of one or more control parameters is determined using a corresponding operation optimization map). The control system 128 then may select a set of one or more control parameters from the one or more sets of one or more control parameters. For example, the control system 128 may process each set of one or more control parameters using a cost function (e.g., a mathematical function that maps values for one or more variables to a total score or cost) to determine one or more costs respectively associated with the one or more sets of one or more control parameters. The cost function may be configured to calculate costs in terms of operational costs, such as emissions costs, performance costs, and/or fuel efficiency costs, among other examples. The control system 128 may identify a set of one or more control parameters that has a lowest cost (e.g., a cost that is less than or equal to the other costs). Accordingly, the control system 128 may generate the control information to indicate each control parameter of the set of one or more control parameters. In this way, the control system 128 may determine one or more optimized control parameters that are to be used to control the plurality of pump systems 104.

As shown by reference number 314, the control system 128 may control the plurality of pump systems 104, such as based on the control information. For example, the control system 128 may process the control information to generate one or more sets of one or more control instructions, wherein each set of one or more control instructions is to cause the plurality of pump systems 104, or components of the plurality of pump systems 104, to be controlled according to a corresponding control parameter indicated by the control information. For example, the control system 128 may generate a first set of control instructions to cause a particular pump system 104 to provide a preferred flow rate of fracturing fluid, a second set of control instructions to cause an engine 202 of a particular pump system 104 to have a preferred speed, and/or a third set of control instructions to cause a transmission 204 of a particular pump system 104 to have a preferred gear. The control system 128 may send the one or more sets of control instructions to the controller 130, which may permit the controller 130 to control the plurality of pump systems 104 according to the one or more sets of control instructions. In this way, the control system 128 may control the plurality of pump systems 104 to provide an optimized performance (e.g., in terms of emissions, fuel efficiency, and/or another performance metric).

In some implementations, the control system 128 may provide information indicating the control information. For example, the control system 128 may provide, for display on a display screen of the control system 128, the information. The information may be displayed, for example, as an alert or notification on the display screen. Additionally, or alternatively, the control system 128 may provide, for display, an action button with which a user of the control system 128, using a user interface of the control system 128, may interact. When the user engages the action button, the control system 128 may control the plurality of pump systems 104 (e.g., based on the control information, as described herein). Alternatively, when the user does not engage the action, the control system 128 may refrain from controlling the plurality of pump systems 104. In this way, the user is able to provide oversight as to when the control system 128 controls the pump-signal combiner 102.

After the control system 128 controls the plurality of pump systems 104, the control system 128 may continually repeat each process step described herein in relation to FIG. 3 as part of an iterative looping process. In some implementations, a particular engine 202 may utilize a gaseous fuel in association with a first iterative loop, but cease to use the gaseous fuel in association with a second iterative loop. Accordingly, during the first iterative loop, the control system 128 may obtain first engine operation information that indicates that the particular engine 202 is utilizing gaseous fuel, may therefore identify the particular engine 202 as included in a set of one or more engines 202 that are utilizing gaseous fuels and may obtain methane number information that indicates an estimated methane number associated with the particular engine 202, and may therefore select a set of one or more operation optimization maps based, in part, on the estimated number of the particular engine 202. During the second iterative loop, the control system 128 may obtain second engine operation information that indicates that the particular engine 202 is not utilizing gaseous fuel, and therefore may not identify the particular engine 202 as included in the set of one or more engines 202 and the methane number information may not include an estimated methane number associated with the particular engine 202. The control system 128 may therefore select a different set of one or more operation optimization maps, because an estimated methane number associated with the particular engine 202 is not included in the methane number information. In this way, the control system 128 may determine control information in the first iterative loop that is different than control information determined by the control system 128 in the second iterative loop. Therefore, the control system 128 may control the plurality of pump systems 104 in association with the first iterative loop in a different manner as compared to that in association with the second iterative loop. Moreover, other parameters or information may change from one iterative loop to another iterative loop, which may cause the control system 128 to continually adjust the manner in which the control system 128 controls the plurality of pump systems 104.

As indicated above, FIG. 3 is provided as an example. Other examples may differ from what is described with regard to FIG. 3.

Figure 4:
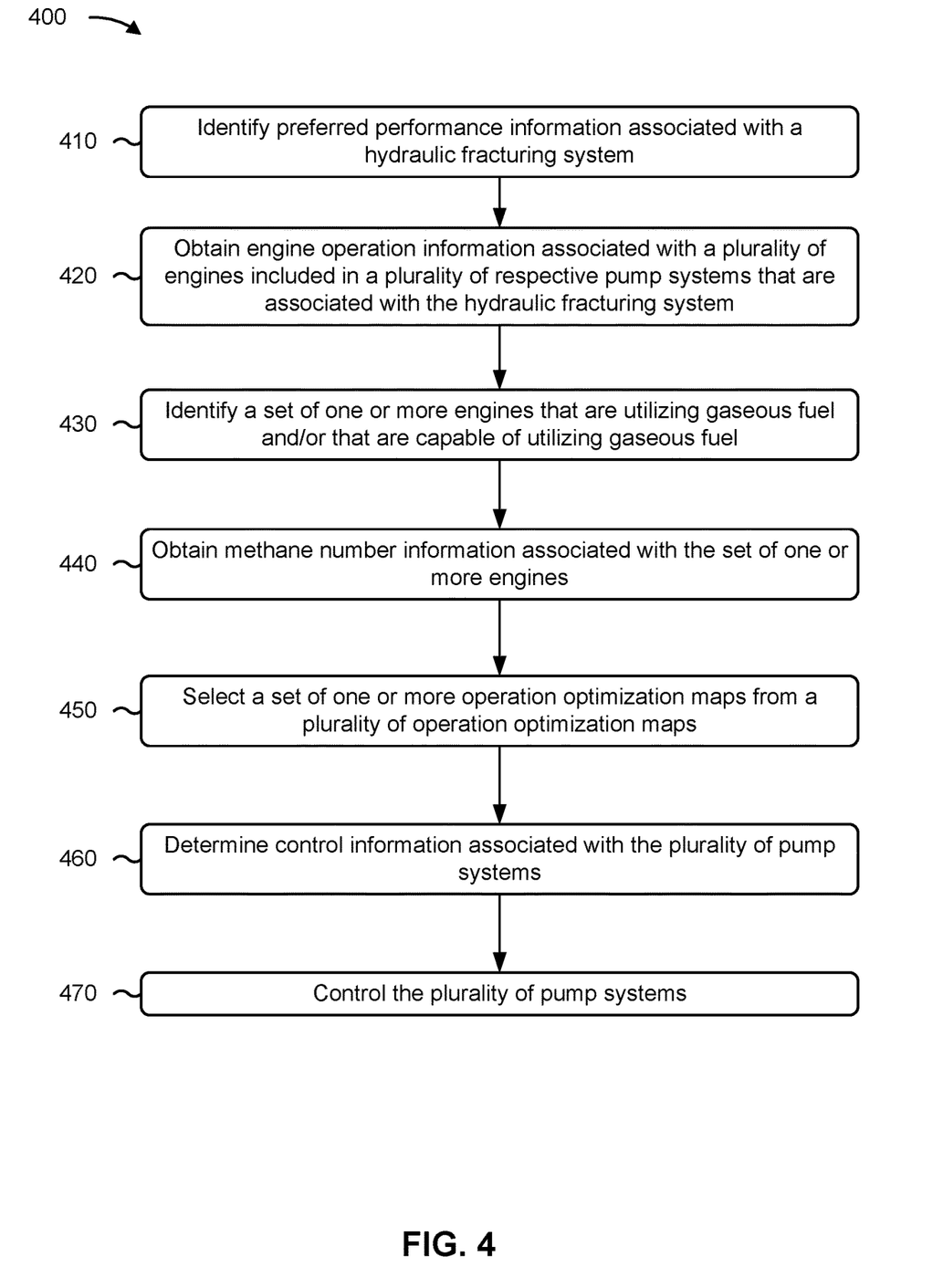
FIG. 4 is a flowchart of an example process associated with closed-loop control of a plurality of pump systems of a hydraulic fracturing system.

FIG. 4 is a flowchart of an example process 400 associated with closed-loop control of a plurality of pump systems of a hydraulic fracturing system. In some implementations, one or more process blocks of FIG. 4 are performed by a control system (e.g., the control system 128). In some implementations, one or more process blocks of FIG. 4 are performed by another device or a group of devices separate from or including the control system, such as a controller (e.g., the controller 130).

As shown in FIG. 4, process 400 may include identifying preferred performance information associated with a hydraulic fracturing system (block 410). For example, the control system may identify preferred performance information associated with a hydraulic fracturing system, as described above.

As further shown in FIG. 4, process 400 may include obtaining engine operation information associated with a plurality of engines included in a plurality of respective pump systems that are associated with the hydraulic fracturing system (block 420). For example, the control system may obtain engine operation information associated with a plurality of engines included in a plurality of respective pump systems that are associated with the hydraulic fracturing system, as described above.

As further shown in FIG. 4, process 400 may include identifying a set of one or more engines that are utilizing gaseous fuel and/or that are capable of utilizing gaseous fuel (block 430). For example, the control system may identify, based on the engine operation information, a set of one or more engines, of the plurality of engines, that are utilizing gaseous fuel and/or that are capable of utilizing gaseous fuel, as described above.

As further shown in FIG. 4, process 400 may include obtaining methane number information associated with the set of one or more engines (block 440). For example, the control system may obtain methane number information associated with the set of one or more engines, as described above.

As further shown in FIG. 4, process 400 may include selecting a set of one or more operation optimization maps from a plurality of operation optimization maps (block 450). For example, the control system may select, based on the preferred performance information and the methane number information, a set of one or more operation optimization maps from a plurality of operation optimization maps, as described above.

As further shown in FIG. 4, process 400 may include determining control information associated with the plurality of pump systems (block 460). For example, the control system may determine, based on the set of one or more operation optimization maps and the engine operation information, control information associated with the plurality of pump systems, as described above.

As further shown in FIG. 4, process 400 may include controlling the plurality of pump systems (block 470). For example, the control system may control, based on the control information, the plurality of pump systems, as described above.

Process 400 may include additional implementations, such as any single implementation or any combination of implementations described in connection with one or more other processes described elsewhere herein.

Although FIG. 4 shows example blocks of process 400, in some implementations, process 400 includes additional blocks, fewer blocks, different blocks, or differently arranged blocks than those depicted in FIG. 4. Additionally, or alternatively, two or more of the blocks of process 400 may be performed in parallel.

INDUSTRIAL APPLICABILITY

Some implementations described herein provide a control system 128 that provides closed-loop control of a plurality of pump systems 104 (that include a plurality of respective engines 202) of a hydraulic fracturing system 100. For example, the control system 128 identifies preferred performance information associated with the hydraulic fracturing system 100, and obtains engine operation information associated with the plurality of engines 202. The control system 128 identifies (e.g., based on the engine operation information) a set of one or more engines 202, of the plurality of engines 202, that are utilizing gaseous fuel and/or that are capable of utilizing gaseous fuel, and thereby obtains methane number information associated with the set of one or more engines 202. The control system 128 selects (e.g., based on the preferred performance information and the methane number information) a set of one or more operation optimization maps from a plurality of operation optimization maps, and determines (e.g., based on the set of one or more operation optimization maps and the engine operation information) control information associated with the plurality of pump systems 104. Accordingly, the control system 128 controls (e.g., based on the control information), the plurality of pump systems 104.

In this way, the control system 128 automatically controls the plurality of pump systems 104 (e.g., controls the plurality of engines 202, a plurality of transmissions 204, and/or other components of the plurality of pump systems 104) such that the plurality of pump systems 104 provide an optimized performance (e.g., in terms of emissions, fuel efficiency, and/or another performance metric), while, at the same time, the hydraulic fracturing system 100 provides a preferred performance (e.g., in terms of fluid flow rate and/or pressure). Accordingly, the control system 128 enables an improved performance of the plurality of pump systems 104 and the hydraulic fracturing system 100 (e.g., by reducing an amount of emissions and/or increasing a fuel efficiency, and providing a preferred hydraulic fracturing performance), as compared implementing a hydraulic fracturing system 100 without the control system 128.

Moreover, because the control system 128 uses an automated process to obtain and/or determine different information, the control system 128 is not reliant on manual, operator input (e.g., for respective estimated methane numbers of the plurality of engines 202). Accordingly, error and delay associated with operator input is minimized, which enables the control system 128 to control the plurality of pump systems 104 in a more accurate manner, which, in turn, further improves a performance of the plurality of pump systems 104 and the hydraulic fracturing system 100.

What is claimed is:

1. A control system, comprising:
   one or more memories; and
   one or more processors, coupled to the one or more memories, configured to:
      identify preferred performance information associated with a hydraulic fracturing system;
      obtain engine operation information associated with a plurality of engines included in a plurality of pump systems that are associated with the hydraulic fracturing system;
      identify, based on the engine operation information, one or more engines, of the plurality of engines, that are utilizing gaseous fuel or that are capable of utilizing gaseous fuel;
      obtain methane number information associated with the one or more engines;
      select, based on the preferred performance information and the methane number information, a particular operation optimization map, from a plurality of operation optimization maps, providing an indication of one or more output parameters of the hydraulic fracturing system as a function of one or more input parameters of the hydraulic fracturing system;
      generate, based on the operation optimization map and the engine operation information, control information associated with the plurality of pump systems; and
      automatically control, based on the control information, operation of the plurality of pump systems.

2. The control system of claim 1, wherein the engine operation information indicates, for each engine, of the plurality of engines, at least one of:
   a speed of the engine,
   a load of the engine,
   an intake manifold air temperature (IMAT) of the engine, or
   a fuel mode of the engine.

3. The control system of claim 1, wherein the preferred performance information indicates at least one of:
   a preferred flow rate of a fracturing fluid of the hydraulic fracturing system,
   a preferred discharge pressure of the fracturing fluid of the hydraulic fracturing system, or
   a preferred inlet pressure of the fracturing fluid of the hydraulic fracturing system.

4. The Currently Amended control system of claim 1, wherein the plurality of operation optimization maps includes at least one of:
   one or more emissions optimization maps,
   one or more performance optimization maps, or
   one or more fuel optimization maps.

5. The control system of claim 1, wherein the control information indicates, for a particular pump system, of the plurality of pump systems, at least one of:
   a preferred flow rate of fracturing fluid of the particular pump system,
   a preferred speed of an engine included in the particular pump system, or
   a preferred gear of a transmission included in the particular pump system.

6. The control system of claim 1, wherein the one or more processors, to identify the one or more engines that are utilizing gaseous fuel or that are capable of utilizing gaseous fuel, are configured to:
process the engine operation information to determine respective fuel modes of the plurality of engines; and
identify, based on the respective fuel modes, particular engines, of the plurality of engines, that are utilizing at least some percentage of gaseous fuel, as the one or more engines.

7. The control system of claim 1, wherein the one or more processors, to obtain the methane number information, are configured to:
provide, to a controller of the hydraulic fracturing system, information identifying the one or more engines, wherein providing the information permits the controller to determine an estimated methane number for each engine of the one or more engines; and
receive, from the controller and based on providing the information, the methane number information.

8. The control system of claim 1, wherein each operation optimization map, of the plurality of operation optimization maps, is associated with respective ranges of performance parameter values and methane numbers,
wherein the particular operation optimization map has:
respective ranges of performance parameter values, in which one or more preferred performance parameters of the hydraulic fracturing system, indicated by the preferred performance information, are included, and
a range of methane numbers in which estimated methane numbers of the one or more engines, indicated by the methane number information, are included.

9. The control system of claim 1, wherein the one or more processors, to generate the control information associated with the plurality of pump systems, are configured to:
process, using the particular operation optimization map, the engine operation information to determine one or more control parameters,
wherein each of the one or more control parameters is determined using a corresponding operation optimization map of the one or more operation optimization maps;
process, using a cost function, each of the one or more control parameters to determine one or more costs that are respectively associated with the one or more control parameters;
identify a particular control parameter, of the one or more control parameters, that has a lowest cost; and
generate the control information to indicate the particular control parameter.

10. The control system of claim 1, wherein the one or more processors, to automatically control operation of the plurality of pump systems, are configured to:
process the control information to generate one or more control instructions; and
send the one or more control instructions to a controller of the hydraulic fracturing system,
wherein sending the one or more control instructions to the controller permits the controller to automatically control operation of the plurality of pump systems according to the one or more control instructions.

11. The control system of claim 1, wherein the one or more processors, to automatically control operation of the plurality of pump systems, are configured to:
adjust, based on the control information, operation of the plurality of pump systems.

12. The control system of claim 11, wherein the one or more processors, to adjust operation of the plurality of pump systems, are configured to:
adjust a preferred flow rate of a fracturing fluid of a particular pump system of the plurality of pump systems,
adjust a speed of an engine included in the particular pump system, or
adjust a gear of a transmission included in the particular pump system.

13. A method, comprising:
obtaining, by a control system, engine operation information associated with a plurality of engines included in a plurality of pump systems that are associated with a hydraulic fracturing system;
identifying, by the control system and based on the engine operation information, one or more engines, of the plurality of engines, that are utilizing gaseous fuel or that are capable of utilizing gaseous fuel;
obtaining, by the control system, methane number information associated with the one or more engines;
generating, based on the methane number information, the engine operation information, and a particular operation optimization map, control information associated with the plurality of pump systems, wherein the particular operation optimization map provides an indication of one or more output parameters of the hydraulic fracturing system as a function of one or more input parameters of the hydraulic fracturing system; and
automatically controlling, based on the control information, the plurality of pump systems.

14. The method of claim 13, wherein identifying the one or more engines that are utilizing gaseous fuel or that are capable of utilizing gaseous fuel comprises:
processing the engine operation information to determine respective fuel modes of the plurality of engines; and
identifying, based on the respective fuel modes, the one or more engines.

15. The method of claim 13, wherein obtaining the methane number information comprises:
providing, to a controller of the hydraulic fracturing system, information identifying the one or more engines to a controller of the hydraulic fracturing system; and
receiving, from the controller and based on providing the information, the methane number information.

16. The method of claim 13, wherein generating the control information associated with the plurality of pump systems comprises:
selecting, based on the methane number information, one or more operation optimization maps from a plurality of operation optimization maps;
processing, using the one or more operation optimization maps, the engine operation information to determine one or more control parameters;
identifying, using a cost function, a particular control parameter, of the one or more control parameters, that has a lowest cost; and
generating the control information to indicate the particular control parameter.

17. A non-transitory computer-readable medium storing a set of instructions, the set of instructions comprising:
one or more instructions that, when executed by one or more processors of a control system, cause the control system to:

obtain engine operation information associated with a plurality of engines included in a plurality of pump systems that are associated with a hydraulic fracturing system;

identify one or more engines, of the plurality of engines, that are utilizing gaseous fuel or that are capable of utilizing gaseous fuel;

select, based on methane number information associated with the one or more engines, an operation optimization map, from a plurality of operation optimization maps, providing an indication of one or more output parameters of the hydraulic fracturing system as a function of one or more input parameters of the hydraulic fracturing system;

generate, based on the one or more operation optimization maps and the engine operation information, control information associated with the plurality of pump systems; and automatically control, based on the control information, the plurality of pump systems.

18. The non-transitory computer-readable medium of claim 17, wherein the one or more instructions, that cause the control system to identify the one or more engines that are utilizing gaseous fuel or that are capable of utilizing gaseous fuel, cause the control system to:

determine respective fuel modes of the plurality of engines; and identify, based on the respective fuel modes, particular engines, of the plurality of engines, that are utilizing at least some percentage of gaseous fuel, as the one or more engines.

19. The non-transitory computer-readable medium of claim 17, wherein the one or more instructions, that cause the control system to generate the control information associated with the plurality of pump systems, cause the control system to:

process, using the one or more operation optimization maps, the engine operation information to determine one or more control parameters, select a particular control parameter from the one or more control parameters; and generate the control information to indicate the particular control parameter.

20. The non-transitory computer-readable medium of claim 17, wherein the one or more instructions, that cause the control system to automatically control the plurality of pump systems, cause the control system to:

process the control information to generate one or more control instructions; and send, to a controller of the hydraulic fracturing system and based on the control information, the one or more sets of control instructions to automatically control operation of the plurality of pump systems according to the one or more control instructions.

* * * * *